April 24, 1951  E. C. CRAIG  2,549,777
BUOYANT ELECTRODE
Filed Dec. 30, 1941
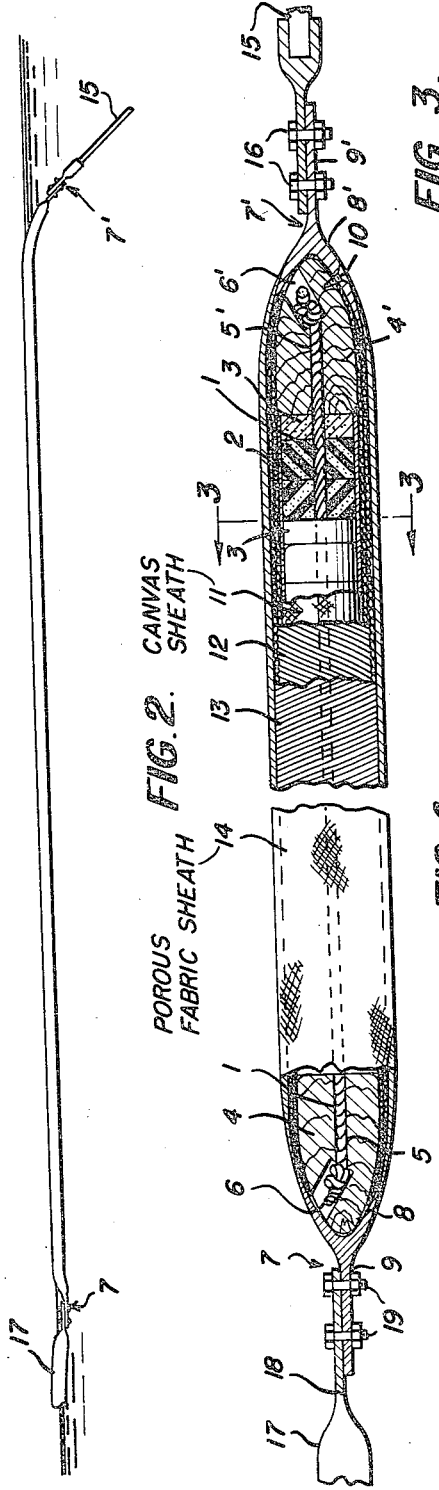
INVENTOR
EDWARD C. CRAIG
BY
ATTORNEYS Patented Apr. 24, 1951

2,549,777

UNITED STATES PATENT OFFICE 2,549,777

BUOYANT ELECTRODE

Edward C. Craig, United States Navy,
Arlington, Va.

Application December 30, 1941, Serial No. 425,011

21 Claims. (Cl. 174—101.5)

(Granted under the act of March 3, 1883, as
amended April 30, 1928; 370 O. G. 757)

This invention relates to electrodes and in particular to such electrodes as are adapted to be attached to, or form a terminal end of, an electric cable for transferring current from the cable to a fluid body such as water. The invention has particular utility in connection with the generation of an electric field within a body of water for mine sweeping operations.

A broad object of the invention is to provide an improved electrode structure from which current may be transferred from a cable to a fluid body.

Another object is to provide a buoyant electrode structure from which current may be transferred from a buoyant cable to the surface of a fluid body with minimum deteriorating electrolytic action between the electrode and the fluid.

A further object is to provide a relatively long and flexible buoyant electrode structure for the purpose described which may be easily stored upon a reel along with the flexible and insulated buoyant cable to which the electrode is connected.

A more specific object of my invention is to provide a buoyant flexible electrode structure which is so constructed that one portion thereof is retained at the surface of the fluid and another portion is retained below the surface.

Still another specific object is to provide a sectionalized water-buoyant electrode from which current may be transferred from a cable to the water, one section thereof being water-buoyant for current transfer at the water's surface, the other section being non-buoyant for current transfer below the surface of the water and connected to the buoyant section in end-to-end relationship.

The foregoing and other objects of my invention will become apparent from the following detailed description and the accompanying drawings, in which like reference characters in the various views indicate like parts.

With respect to the drawings,

Fig. 1 is a diagrammatic view showing the approximate position taken by an electrode structure made in accordance with my invention when put into operation and trailed behind a towing vessel;

Fig. 2 is a fragmentary longitudinal view partly in section and partly in elevation of one type of electrode structure;

Fig. 3 is a transverse section taken on lines 3—3 of Fig. 2; and

Fig. 4 is a longitudinal sectional view of a modification of the buoyant electrode assembly illustrated in Fig. 2.

Referring now to Fig. 2, which is a preferred embodiment of my invention, the electrode comprises a buoyant section and a non-buoyant section. The buoyant section contains a central flexible core 1 which may be made of any suitable material such as, for example, twisted fibers. I have found that manila rope of approximately ½" in diameter, having a weight of .075 lb. per linear foot, is quite satisfactory. While this rope-like core is somewhat buoyant, the principal buoyancy to the electrode is furnished by cellular members 2 and 3 which are cored and seriately and alternately arranged on core member 1.

Member 2 is preferably relatively rigid to impart rigidity transversely of the electrode which prevents deformation of the electrode when subjected to undulations caused by wave action, or when stored upon a reel, and must also have a substantial positive factor of buoyancy. I have found that a hard cellular rubber, which is well known and commercially available, and which has a weight of approximately 7.5 lbs. per cubic foot, is satisfactory.

The buoyancy of cellular rubber, not to be confused with ordinary sponge rubber, is attributable to the presence of gases such as, for example, nitrogen, which are trapped within the cells during its manufacture. The properties of this rubber are such that it is most rigid at its exterior surface. Accordingly, I prefer that each of the members 2 shall comprise two layers of hard cellular rubber, each approximately 1½" thick, cemented together. By such construction each of the members will have four exterior surfaces. Obviously, if further rigidity is desired, each of the members 2 may be made up of more than two layers cemented together.

Member 3 is preferably relatively non-rigid to impart longitudinal flexibility to the electrode so that the electrode may undulate in response to wave action and be easily stored upon a reel. Soft cellular rubber, approximately 1" thick, having a weight of approximately 9 lbs. per cubic foot, serves this purpose quite well.

At each end of the series of alternately arranged hard and soft cellular members, I provide block members 4—4' which are preferably of hard wood. Blocks 4—4' contain central bores 5 and 5' of approximately the same diameter as rope core 1, the bores being enlarged at 6 and 6' to provide for knotting the rope 1.

Electrode terminal members 7—7' are provided for block members 4 and 4' respectively. Terminals 7—7' are provided with cupped portions 8—8' shaped to receive the ends of the blocks 4—4' associated therewith which may be tapered, and shank portions 9—9'. Any suitable fastening means such as screws 10 are utilized to hold blocks 4—4' securely within the cupped portions 8—8' of terminal members 7—7'.

A sheath 11, preferably of a canvas treated to render it resistant to acids which may be in the water, is laid over cellular members 2 and 3 to form a base for the conductive layers 12 and 13.

A first conductive layer 12, of approximately 375,000 circular mills in area, is made up of a plurality of conductors, preferably copper, which are arranged in a helix about sheath 11. The second conductive layer 13, also of approximately 375,000 circular mills in cross-section, is constructed similarly to layer 12 and arranged helically about the first conductive layer. However, to prevent the conductive layers 12 and 13 from exerting a twisting action upon the electrode structure, the conductor helices progress in opposite directions, one clockwise and the other counterclockwise.

Over the second conductive layer is preferably placed a porous sheath 14 which may be porous cloth so that the current in the conductive layers may be transferred to the water. Sheath 14 serves two functions. First, it protects the conductive layer 13 from abrasion, and secondly, it reduces considerably the electrolytic action which takes place between the copper and water. Since the latter, in most instances, is salty and therefore a good electrolyte, the copper conductors of layers 12 and 13 would be reduced at a rapid rate were the water to be permitted to flow directly over and in contact with the surface of the conductive layer, as the electrode is pulled through the water. By providing a porous sheath, however, over the conductive layer, this direct flow is eliminated, with the result that electrolytic action is materially lessened.

As illustrated in Fig. 1, I prefer to design my electrode so that a portion thereof will be retained below the water's surface. Were the electrode structure not so designed as to retain an end portion thereof below the water's surface, considerable "flashing" might occur between the end of the electrode and the surface of the water as the electrode end is whipped out of contact with the water by wave action. Although this may be done in several different ways, in the present embodiment, a bare metallic cable section 15, obviously non-buoyant, is connected to the shank portion 9 of terminal member 7 by bolts 16. In the present embodiment, cable 15 has an area of 500,000 circular mills and is of stranded copper.

By making cellular members 2 and 3 approximately 3⅛" in diameter, the positive or "reserve" buoyancy per linear foot of the electrode will be approximately 1.482 lbs. If the buoyant section between electrode terminals 7—7' is approximately 130 feet long and cable 15 is 10 feet in length, the combined specific gravity of the electrode structure including terminal members 7—7' and cable 15 will be approximately .70. With such construction, approximately a 12 foot section of the buoyant electrode adjacent terminal 7' will be carried below the surface of the water, as illustrated in Fig. 1.

In Fig. 4, a modified structure is illustrated. This structure is similar to that shown in Fig. 2, except that instead of utilizing non-rigid members made of soft cellular rubber, I provide discs 3' which may be ⅛" thick, made of ordinary rubber which has a weight of approximately 61 lbs. per cubic foot. Such a construction may be desirable in cases where compressional forces to which the electrode may be subjected are such as may cause a breakdown in the cell structures formed within the soft cellular rubber, which would obviously permit the gases to leak out and destroy its buoyancy. With this type of construction, the positive buoyancy per linear foot of electrode will be 1.265 lbs. A 130 foot length of the modified electrode, including terminals 7—7' and cable 15, will have a combined specific gravity of approximately .75, and a 14 foot section of the buoyant electrode adjacent terminal 7' will be carried below the water's surface.

In the illustrated embodiment of my invention, the buoyant electrode is adapted to be towed behind a buoyant insulated cable 17. The connection between the electrode and the insulated cable may be made by any suitable means such as, for example, by forming a terminal structure 18 upon insulated cable 17 and connecting the said terminal 18 to the shank portion 9 of the electrode terminal 7 by bolts 19.

If desired, the exposed metallic portions of the electrode terminals 7 and 7' may be covered with rubber tape to prevent electrolytic action between such terminals and the water.

It will be evident that various changes and modifications may be made in my invention without departing from the spirit and scope thereof, and accordingly I desire it to be understood that only such limitations as are necessitated by the prior art shall be made upon the claims appended hereto. For example, it may be desirable in some cases to delete the electrode terminal 7, in which case the electrode could be formed as an integral part of the buoyant cable 17 with or without the non-buoyant section 15.

Also, it may be desirable in certain cases to eliminate the bare non-buoyant cable 15, and substitute therefor a weighted member which would be attached to the end of the electrode in such a manner as to cause the trailing end thereof to be carried below the surface of the water.

The invention described herein may be manufactured and used by or for the Government of the United States of America for governmental purposes without the payment of any royalties thereon or therefor.

Having thus set forth and disclosed the nature of this invention, what is claimed is:

1. A composite water-buoyant flexible electrode adapted to be connected to the end of an insulated buoyant flexible cable, said electrode comprising a flexible buoyant section having conductors which are exposed for electrical contact with the water, a flexible non-buoyant section; and means for connecting said buoyant and non-buoyant sections in end-to-end relation, the ratio of buoyancy of said buoyant and non-buoyant sections being selected to retain a minor portion of the buoyant section submerged.

2. A sectionalized water-buoyant electrode adapted to be placed in electrical contact with water for transferring current from a cable to the water comprising, a buoyant electrode section comprising sectionalized contiguous members secured together and a conducting member in contact with the water supported thereby, said section being connected to said cable, a non-buoyant electrode section of small negative buoyancy compared to the buoyancy of said buoyant section, and means for coupling said sections in end-to-end relation, said non-buoyant section being arranged to trail behind the buoyant section in submerged condition.

3. A composite cable electrode structure comprising, a leading water-buoyant electrode section, a trailing non-buoyant electrode section, both electrode sections being exposed for contact with water thereabout, the ratio of the volumes of the buoyant section in said electrode structure to the non-buoyant section thereof being such as to retain a substantial portion of said buoyant section at the water surface, and means for coupling said buoyant and non-buoyant sections in end-to-end relation.

4. An electrode structure comprising, a flexible longitudinal water-buoyant member, an electrode supported by said buoyant member, said electrode extending co-axially along said buoyant member and being adapted to be in electrical contact with the water, a non-buoyant flexible longitudinal electrode, and means for connecting one end of said non-buoyant electrode to the trailing end of the electrode supported by said buoyant member, the ratio of the volumes of the buoyant elements of said electrode structure to the non-buoyant elements thereof being such that a substantial portion of said water-buoyant member is retained at the water surface.

5. An electric power conductor cable adapted for use upon a body of water, said cable comprising; a first water-buoyant portion having electrical conducting members which are electrically insulated from the body of water; and a second water-buoyant portion including electrical conductors connected to said conducting members and in electrical contact with the body of water, said contact between the conductors of the second portion and the body of water being made through a water porous non-conducting sheath member overlying said conductors, whereby power is conducted to the water from said second portion of the cable.

6. An electric power conductor cable adapted for use upon a body of water, said cable comprising; a first flexible water-buoyant portion having electrical conducting members which are insulated electrically from the body of water and a second flexible water-buoyant portion including electrical conductors connected to said conducting members and in electrical contact with the body of water, said electrical contact between the conductors of the second portion and the body of water being made through a water porous non-conducting sheath member overlying said conductor, whereby power is conducted to the water only from said second portion of the cable.

7. A cable electrode structure adapted to be trailed in water comprising, a water-buoyant section including a plurality of seriately arranged relatively rigid buoyant members, a relatively non-rigid member disposed between adjacent rigid members to impart flexibility to said electrode structure, a cylindrical conductive member surrounding and extending axially along said seriately arranged members in mutual supporting relation; a non-buoyant conductive section; and means for connecting said non-buoyant section to the trailing end portion of said water-buoyant section, the ratio of the buoyant to non-buoyant elements included in said electrode structure being such that a substantial leading portion of said buoyant section is retained upon the surface of the water.

8. A water buoyant electrode comprising, a flexible buoyant longitudinal core member, a conductive layer overlying said core member and a water porous non-conducting sheath overlying said conductive layer and adapted to be in direct contact with the water.

9. An electrode comprising, a plurality of seriately and alternately arranged relatively rigid and relatively non-rigid members, at least said rigid members being water-buoyant, a conductive layer overlying said seriately arranged members, and a water porous non-conducting sheath overlying said conductive layer, the ratio of the buoyant to non-buoyant elements of said electrode being such that said electrode has a positive buoyancy in water.

10. An electrode comprising, a plurality of seriately and alternately arranged relatively rigid and relatively non-rigid water-buoyant cellular rubber members, a conductive layer overlying said seriately arranged members, and a porous non-conducting sheath overlying said conductive layer, the ratio of the buoyant to non-buoyant elements of said electrode being such that said electrode has a positive buoyancy in water.

11. An electric cable electrode adapted to be connected to a water-buoyant insulated electric cable, said electrode comprising, a plurality of seriately arranged relatively rigid water-buoyant members, a relatively non-rigid member disposed between adjacent ends of pairs of said rigid members to impart cable flexibility, a sheath member overlying said rigid and non-rigid members, a first conductive layer comprising a plurality of metallic conductors arranged helically about said sheath member, a second conductive layer comprising a plurality of helically arranged metallic conductors overlying said first metallic conductive layer, said helices being arranged in opposite directions, and a water porous non-conducting sheath overlying said second conductive layer whereby said conductive layers may be in electrical contact with the water, the ratio of buoyant to non-buoyant elements of said electrode being such that said electrode has a positive buoyancy in water.

12. An electrode comprising a plurality of seriately and alternately arranged relatively rigid and relatively non-rigid cellular rubber members, a sheath overlying said cellular members, a first conductive layer comprising a plurality of metallic conductors arranged in a helix about said sheath, a second conductive layer comprising a plurality of metallic conductors arranged in a helix about said first conductive layer, said helices being longitudinally progressive in opposite directions, and a water-porous non-conducting sheath overlying said second conductive layer, the ratio of buoyant to non-buoyant elements of said electrode being such that said electrode has a positive buoyancy in water.

13. A composite electrode comprising water-buoyant and non-buoyant cable sections; said buoyant section comprising a plurality of seriately arranged relatively rigid buoyant members, a relatively non-rigid member disposed between adjacent rigid members to impart flexibility to said electrode, a sheath member overlying said rigid and non-rigid members, a conductor member overlying said sheath member and a porous non-conducting sheath overlying said conductor member; said non-buoyant section comprising a flexible metallic cable; and means for mechanically and electrically coupling said buoyant and non-buoyant sections in end-to-end relation, the ratio of volumes of the buoyant to non-buoyant elements of said electrode structure being such that a substantial portion of said buoyant section is retained upon the surface of the water.

14. An electric cable electrode structure adapted to be connected to a water-buoyant insulated electric cable comprising a water-buoyant electrode section and a non-buoyant electrode section, said buoyant section including a plurality of seriately arranged relatively rigid water-buoyant members, a relatively non-rigid member disposed between adjacent ends of said rigid members to impart cable flexibility, a sheath member overlying said rigid and non-rigid members, a first conductive layer comprising a plurality of metallic conductors arranged helically about said sheath member, a second conductive layer comprising a plurality of helically arranged metallic conductors overlying said first metallic conductive layer, said helices being arranged in opposite directions, and a water-porous non-conducting sheath overlying said second conductive layer whereby said conductive layers may be in electrical contact with the water, and means for coupling said buoyant and non-buoyant electrode sections, the ratio of volumes of the buoyant to non-buoyant elements of said electrode structure being such that a substantial portion of said buoyant section is retained in contact with the surface of the water.

15. A composite cable electrode comprising buoyant and non-buoyant cable sections; said buoyant section comprising a plurality of longitudinally arranged relatively rigid buoyant members, a relatively non-rigid member disposed between adjacent rigid members to impart flexibility to said electrode, a conductive member overlying said rigid and non-rigid members and a porous non-conducting sheath overlying said conductive member; said non-buoyant section comprising a bare metallic cable; and means for coupling said buoyant and non-buoyant sections in end-to-end relation.

16. An electrode comprising, a plurality of seriately arranged relatively rigid water-buoyant members, a relatively non-rigid member disposed between adjacent ends of pairs of said rigid members to impart flexibility to said electrode structure, a block member secured at each end of said seriately arranged members, a conductive terminal member for each of said block members, each said terminal member including a cupped portion for receiving said block members, a sheath member overlying said rigid and non-rigid members, a first conductive layer comprising a plurality of metallic conductors arranged helically about said sheath member, a second conductive layer comprising a plurality of helically arranged metallic conductors overlying said first metallic conductive layer, the helices of said conductive layers being arranged in opposite directions, means for connecting said conductive layers to said terminal members, and a water porous non-conducting sheath overlying said second conductive layer whereby said conductive layers may be in electrical contact with the water, the ratio of buoyant to non-buoyant elements of said electrode being such that said electrode has a positive buoyancy in water.

17. An electrode structure as defined in claim 16 and including a non-buoyant flexible metallic electrode and means for connecting said non-buoyant electrode to one of said terminal members, the ratio of volumes of buoyant to non-buoyant elements of said electrode structure being such that a substantial portion of said buoyant electrode section is retained upon the water surface.

18. An electrode comprising, a plurality of seriately arranged relatively rigid water-buoyant members, a relatively non-rigid water-buoyant member disposed between adjacent ends of pairs of said rigid members to impart flexibility to said electrode structure, a sheath member overlying said rigid and non-rigid members, a first conductive layer comprising a plurality of metallic conductors arranged helically about said sheath member, a second conductive layer comprising a plurality of helically arranged metallic conductors overlying said first metallic conductive layer, the helices of said conductive layers being arranged in opposite directions, and a water porous non-conducting sheath overlying said second conductive layer whereby said conductive layers may be in electrical contact with the water, a terminal block member secured at each end of said seriately arranged members and a metallic connector for each of said block members, each said connector including a cupped portion for receiving and securing therein its respectively associated block member and said conductive layers, the ratio of buoyant to non-buoyant elements of said electrode being such that said electrode has a positive buoyancy in water.

19. A cable electrode structure comprising; a water-buoyant section, said buoyant section including a plurality of seriately arranged relatively rigid buoyant cellular rubber members, a relatively non-rigid cellular rubber member disposed between adjacent ends of said rigid members to impart flexibility to said electrode, a sheath member overlying said cellular rubber members, a first conductive layer comprising a plurality of metallic conductors arranged helically about said sheath member, a second conductive layer comprising a plurality of helically arranged metallic conductors overlying said first conductive layer, the helices of said conductive layers being arranged in opposite directions, a water porous non-conducting sheath overlying said second conductive layer whereby said conductive layers may be in electrical contact with the water, a block member secured at each end of said seriately arranged members, an electrically conductive terminal member for each block member, each said terminal member including a cupped portion for receiving its respectively associated block member and for electrical connection with said conductive layers; a non-buoyant flexible member having conductive exposed surfaces; and means for connecting said non-buoyant member to one of said terminal members, the ratio of the volumes of the buoyant to non-buoyant elements of said electrode structure being such that a substantial portion of said buoyant section is retained upon the water surface.

20. An electrode comprising, a rope-like core member, a plurality of relatively rigid water-buoyant members, a plurality of relatively non-rigid members, said rigid and non-rigid members being cored and arranged alternately upon said core member, a cored block member disposed at each end of said seriately arranged rigid and non-rigid members for receiving and terminating said core member, a sheath member overlying said seriately arranged members, a first conductive layer comprising a plurality of conductors arranged helically about said sheath member, a second conductive layer comprising a plurality of helically arranged conductors overlying said first conductive layer, the helices of said conductive layers being arranged in opposite directions, a water porous non-conducting sheath overlying said second conductive layer, an electrically conductive terminal member secured to each of said block members, each such terminal member including a terminal portion and a cupped portion for receiving its respectively associated block member and said conductive layers, and a non-buoyant electrode element connected to a terminal member, the ratio of buoyant to non-buoyant elements of said electrode being such that said electrode has a positive buoyancy in water.

21. A buoyant electrode comprising a center composed of a plurality of core members, bare wires or strands laid up about said center and a non-metallic fabric sheath about said wires or strands, the weight to volume ratio of the electrode being such as to render the electrode buoyant in sea water, said sheath being water pervious and protecting said electrode against loss of metal due to electrolytic corrosion when an electric current is passed through the water in which the electrode is floating to a companion electrode.

EDWARD C. CRAIG.

REFERENCES CITED

The following references are of record in the file of this patent:

UNITED STATES PATENTS

| Number | Name | Date |
| --- | --- | --- |
| 563,274 | Guilleaume | July 7, 1896 |
| 2,002,739 | Herkenberg | May 28, 1935 |
| 2,048,811 | Peirce | July 28, 1936 |
| 2,394,611 | Hickernell | Feb. 12, 1946 |
| 2,453,418 | Dunsheath et al. | Nov. 9, 1948 |

FOREIGN PATENTS

| Number | Country | Date |
| --- | --- | --- |
| 5,275 of 1894 | England | Jan. 19, 1895 |